(12) United States Patent
Kitamine

(10) Patent No.: US 6,424,798 B1
(45) Date of Patent: Jul. 23, 2002

(54) DEVICE FOR CONTROLLING SENSORLESS BRUSHLESS-DC-MOTOR

(75) Inventor: Yasukazu Kitamine, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/576,631

(22) Filed: May 24, 2000

(30) Foreign Application Priority Data

May 31, 1999 (JP) ............................................. 11-151058

(51) Int. Cl.[7] ................................................ H02P 5/00
(52) U.S. Cl. ........................ 388/800; 318/138; 318/139; 318/245; 318/254; 318/369; 318/370; 318/371; 318/439
(58) Field of Search ................................. 318/138, 139, 318/254, 245, 439, 369, 370, 371, 268; 701/41, 50; 363/55, 41

(56) References Cited

U.S. PATENT DOCUMENTS

| | | | | |
|---|---|---|---|---|
| 4,546,293 A | * | 10/1985 | Peterson et al. | |
| 4,967,188 A | * | 10/1990 | Collins, Jr. | |
| 5,291,106 A | * | 3/1994 | Murty et al. | |
| 5,384,522 A | * | 1/1995 | Toriyama et al. | |
| 5,644,202 A | * | 7/1997 | Toriyama et al. | |
| 5,694,010 A | * | 12/1997 | Oomura et al. | |
| 5,744,921 A | * | 4/1998 | Makaran | |
| 5,936,364 A | | 8/1999 | Ohsawa et al. | |
| 6,034,494 A | * | 3/2000 | Kitamine et al. | |
| 6,037,726 A | * | 3/2000 | Tabata et al. | |
| 6,052,633 A | * | 4/2000 | Fukuyama et al. | |
| 6,054,818 A | * | 4/2000 | Tabata et al. | |
| 6,153,993 A | * | 11/2000 | Oomura et al. | |
| 6,236,175 B1 | * | 5/2001 | Mourad et al. | |

FOREIGN PATENT DOCUMENTS

JP 11-356081 12/1999

* cited by examiner

*Primary Examiner*—Robert E. Nappi
*Assistant Examiner*—Tyrone Smith
(74) *Attorney, Agent, or Firm*—Oliff & Berridge, PLC

(57) ABSTRACT

A sensorless brushless-DC-motor mounted on an electric or hybrid vehicle is powered by an on-board battery through an inverter supplying a three-phase pulse width modulated voltage (PWM voltage). The inverter is controlled to generate the PWM voltage having an average voltage level corresponding to a target motor speed. The PWM voltage level is controlled by changing its duty ratio, so that a difference between the target motor speed and an actual motor speed is minimized. The actual motor speed is determined based on a signal indicating a rotor position detected from the PWM voltage imposed on the motor. When the battery voltage drops and the duty ratio becomes 100%, the target motor speed is temporarily reduced to the level of the actual motor speed. When the battery voltage is recovered and the duty ratio becomes lower than 100%, the target motor speed is gradually increased again to the original level. In this manner, even if the battery voltage abruptly increases, the PWM voltage is properly controlled, and thereby the motor is stably driven without causing loss of synchronism.

3 Claims, 5 Drawing Sheets

DEVICE FOR CONTROLLING SENSORLESS BRUSHLESS-DC-MOTOR

CROSS-REFERENCE TO RELATED APPLICATION

This application is based upon and claims benefit of priority of Japanese Patent Application No. Hei-11-151058 filed on May 31, 1999, the content of which is incorporated herein by reference.

BACKGROUND OF THE INVENTION

1. Field of the Invention

The present invention relates to a device for driving, in a controlled manner, a sensorless brushless-DC-motor such as a motor used in an electric vehicle or a hybrid electric vehicle.

2. Description of Related Art

There are two types of brushless-DC-motors, one having a rotational position sensor and the other having no such sensor. A phase, frequency and rotational speed of the motor are determined based upon a rotor position detected by the rotational position sensor in the motor having the sensor, while those are determined based upon a rotor position estimated from a motor voltage imposed thereon in the motor having no sensor.

In a conventional sensorless brushless-DC-motor, a rotor position is determined based on a motor voltage detected, and a rotational speed of the motor Nm is determined from a cyclic period of a signal indicating the rotor position. The motor speed Nm is controlled to a target speed Nt by supplying a motor voltage that is PWM-controlled based on a difference between the motor speed Nm and the target speed Nt. More particularly, a duty ratio Dr of the pulse width modulated (PWM) voltage supplied to the motor is increased or decreased in accordance with the difference between Nm and Nt.

However, in the conventional control, there is a problem that the rotor position is erroneously determined when a DC power source voltage is abruptly changed, because the rotor position is determined based on a DC voltage detected. The erroneous determination of the rotor position may result in a halt of the motor due to a loss of synchronism, because the motor speed is determined from the rotor position, and the duty ratio of the PWM voltage is calculated based on the motor speed. The abrupt change of the DC power source voltage often occurs in an electric vehicle or a hybrid vehicle when it is operated under regenerative braking. In this case, the power source voltage abruptly increases due to the regenerated energy.

The problem above mentioned is especially notable under the following situation: A DC power source voltage of an electric vehicle is considerably low, and accordingly the motor is being driven at a speed lower than a target speed with a PWM duty ratio fixed to 100%. If the power source voltage abruptly increases, under this situation, due to regenerative braking, the duty ratio cannot quickly follow the abrupt increase of the power source voltage. This results in an abrupt increase of the motor torque, or a halt of a motor due to loss of synchronism caused by erroneous determination of the rotor position.

SUMMARY OF THE INVENTION

The present invention has been made in view of the above-mentioned problem, and an object of the present invention is to provide an improved motor controller which is able to stably control a sensorless brushless-DC-motor even if a power source voltage is abruptly changed.

A sensorless brushless-DC-motor mounted on an electric or hybrid vehicle is driven by an on-board DC power source, i.e., a battery. The DC power of the battery is inverted into a three-phase pulse width modulated voltage (a PWM voltage) through an inverter controlled by an associated controller. The PWM voltage is supplied to the motor to drive it in a controlled manner. An average level of the PWM voltage is controlled by changing a duty ratio of the PWM voltage. The duty ratio is controlled to minimize a difference between a target motor speed and an actual motor speed.

The actual motor speed is determined based on a signal indicating a rotor position which is in turn detected based on the PWM voltage imposed on the motor. On the other hand, the target motor speed is fed to the controller from outside. The PWM voltage is controlled so that fluctuation of the battery voltage does not influence the level of the PWM voltage. Since the rotor position is detected based on the PWM voltage thus controlled, it is detected with a high accuracy.

When the battery voltage drops for some reason and thereby the duty ratio reaches 100% to compensate for the battery voltage drop, the original target motor speed is reduced to a level of the detected actual motor speed. The reduced level is maintained until the duty ratio becomes lower than 100%. When the battery voltage increases again and the duty ratio becomes lower than 100%, the target motor speed is gradually increased to the original level. In this manner, when the battery voltage is abruptly increased by regenerative braking or the like, an excessive sudden increase of the PWM voltage is avoided. Accordingly, the rotor position is accurately detected based on the PWM voltage, and the motor is properly controlled without causing loss of synchronism.

According to the present invention, the sensorless brushless-DC-motor is stably controlled irrespective of an abrupt change of the battery voltage.

Other objects and features of the present invention will become more readily apparent from a better understanding of the preferred embodiment described below with reference to the following drawings.

DETAILED DESCRIPTION OF THE PREFERRED EMBODIMENT

Figure 1:
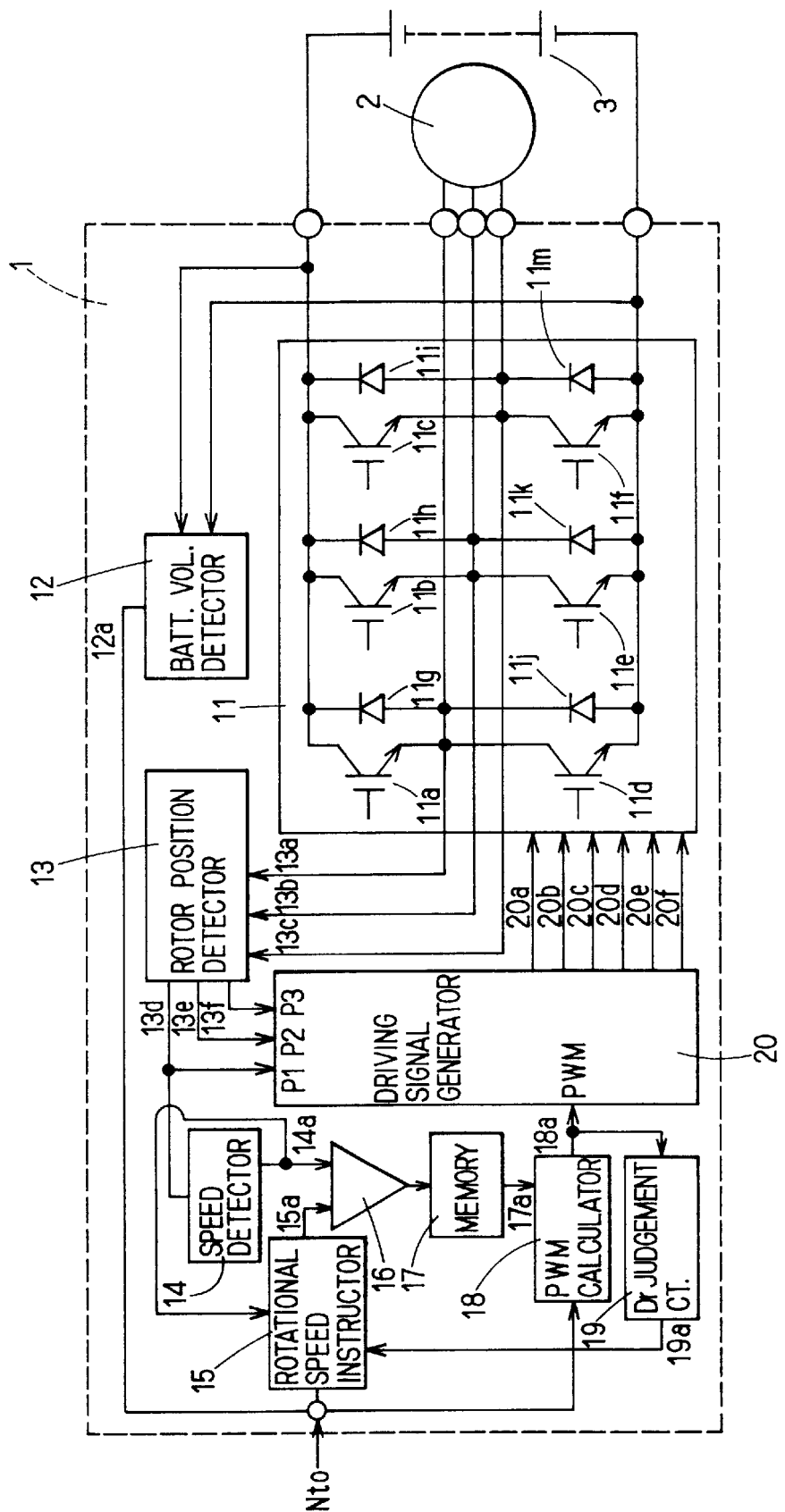
FIG. 1 is a block diagram showing a whole structure of a motor controller according to the present invention together with a motor and a power source.

A whole structure of a motor controller according to the present invention will be described in reference to FIG. 1. A sensorless brushless-DC-motor 2 is mounted on an electric vehicle and is driven by a high voltage DC power source 3 (a battery) under control of a motor controller 1. The motor controller 1 includes: an inverter 11, a battery voltage detector 12, a rotor position detector 13, a rotational speed detector 14, a rotational speed instructor 15, a rotational speed controller 16, a memory 17, a PWM calculator 18, a duty ratio judgment circuit 19, and a driving signal generator 20.

The inverter 11 is a conventional one and includes upper arm semiconductor switching elements 11a–11c (IGBTs are used in this particular embodiment), lower arm semiconductor switching elements 11d–11f, and recirculating diodes 11g–11m. The battery voltage detector 12 detects the voltage of the power source 3. The rotor position detector 13 detects pulse signals generated based on the voltage imposed on the motor (referred to as a motor voltage) for indicating a position of a rotor of the motor 2. The rotational speed detector 14 calculates a rotational speed of the rotor as a reciprocal of a cyclic period of the pulse signals indicating the rotor position. The rotational speed instructor 15 outputs a target rotational speed Nt which is the same as a predetermined target speed $Nt_0$ fed from the outside or is modified according to a duty ratio judgment signal fed from the duty ratio judgment circuit 19.

The rotational speed controller 16 calculates a difference between the target rotational speed Nt and a detected motor speed Nm and formulates an instructed motor voltage Vinst that increases or decreases the motor speed to reduce the difference between Nt and Nm. The instructed motor voltage Vinst is formulated by adding a predetermined voltage unit corresponding to a predetermined duty ratio to a present motor voltage, when the motor speed Nm is lower than the target speed Nt. When the motor speed Nm is higher than the target speed Nt, the instructed motor voltage Vinst is formulated by deducting a predetermined voltage unit corresponding to a predetermined duty ratio from a present motor voltage. The memory 17 stores the instructed motor voltage Vinst fed from the rotational speed controller 16.

The PWM calculator 19 calculates a duty ratio Dr of the inverter 11 based on a power source voltage Vb (a battery voltage) detected by the battery voltage detector 12 and the instructed motor voltage Vinst stored in the memory 17, and outputs a PWM signal having the calculated duty ratio Dr and a predetermined carrier frequency. The duty ratio judgment circuit 19 determines whether the duty ratio Dr of the PWM signal is 100% or not. The driving signal generator 20 generates a gate voltage Vg that controls operation of the switching elements 11a–11f in the inverter 11, based on the rotor position signal fed from the rotor position detector 13 and the PWM signal fed from the PWM calculator 18.

The various components or circuits included in the motor controller 1 other than the inverter 11 are correctively referred to as an inverter controller. Of the various components in the motor controller, the rotor position detector 13, the rotational speed instructor 15, the PWM calculator 18, the duty ratio judgment circuit 19, and the driving signal generator 20 will be further explained below because those components are peculiar to the present invention. The reference numbers shown in FIG. 1, not explained above, correspond to respective voltages or signals as follows: 12a to the battery voltage Vb, 13a–13c to the motor voltage Vm, 13d–13e to the rotor position signal P, 14a to the motor speed Nm, 15a to the target motor speed Nt, 17a to the instructed motor voltage Vinst, 18a to the duty ratio Dr of the PWM voltage, 19a to the duty ratio judgment signal, and 20a–20f to the gate voltage Vg.

Figure 2:
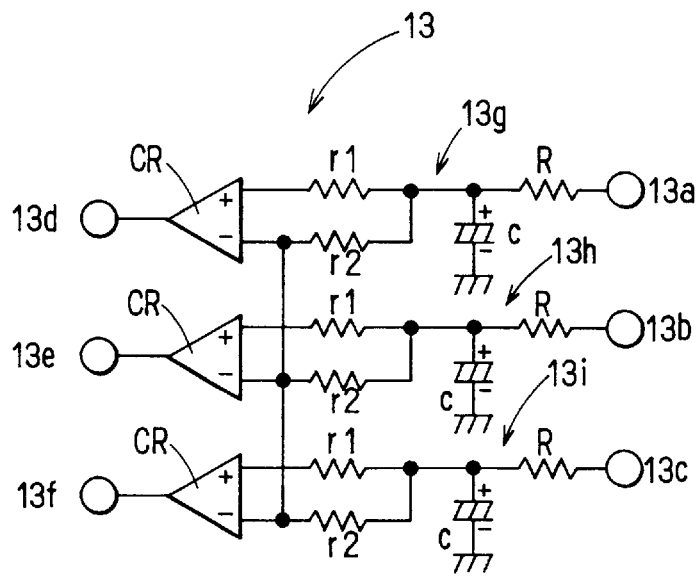
FIG. 2 is a circuit diagram showing a rotor position detector in the motor controller.

The details of the rotor position detector 13 are shown in FIG. 2. The rotor position detector 13 is composed of three rotor position detecting circuits, each corresponding to each phase and having an identical structure. Each rotor position detecting circuit is composed of an integrating circuit consisting of a resistor R and a condenser C, resistors r1, r2 and a comparator CR. Those components are connected as shown in FIG. 2. The integrating circuit eliminates a carrier frequency from the PWM voltage. The motor voltage Vm (13a–13c, each corresponding to each phase) is fed from one end of the rotor position detector 13, and the rotor position signal P (13d–13f, each corresponding to each phase) is output from the other end.

A minus terminal of each comparator CR is connected to the integrating circuit through the resistor r2 and commonly connected to each other, so that an average motor voltage of three phases is fed to the minus terminal. A plus terminal of each comparator CR is connected to the respective integrating circuit through the resistor r1. Thus, each rotor position detecting circuit outputs a high level rotor position signal P when the motor voltage Vm of each phase is higher than the average motor voltage.

Figure 3:
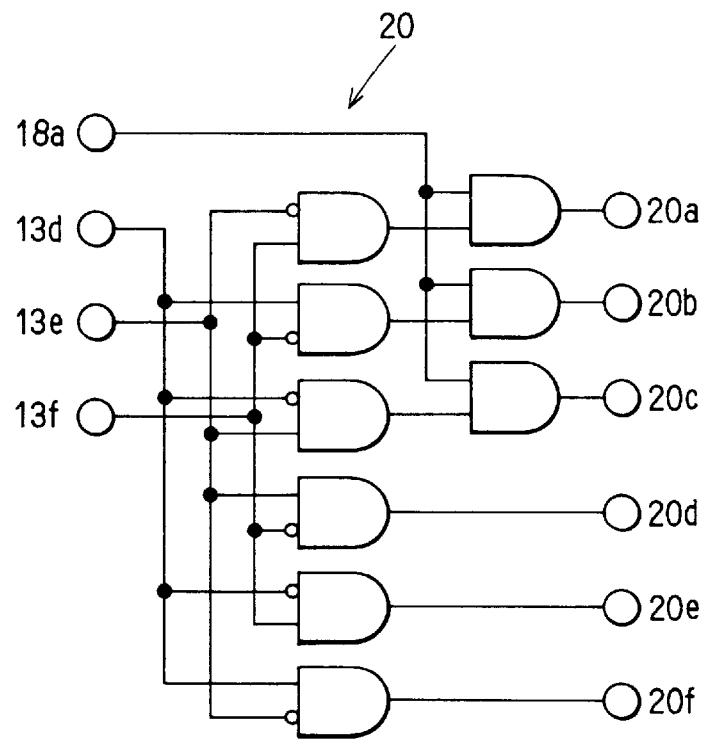
FIG. 3 is a circuit diagram showing a driving signal generator in the motor controller.

The structure of the driving signal generator 20 is shown in FIG. 3. The driving signal generator 20 is composed of logic circuits as shown. The PWM signal (18a) from the PWM calculator 18 and the rotor position signal P (13d–13f) from the rotor position detector 13 are fed to the driving signal generator 20, and gate voltage Vg (20a–20f) is generated according to operation of the logic circuits. The operation of this circuit will be explained later, referring to the timing chart shown in FIG. 5.

The rotational speed instructor 15, the PWM calculator 18 and the duty ratio judgment circuit 19 are structured in software of a microcomputer in this particular embodiment, though they can be properly structured by hardware. Their operation will be described in reference to the flowchart shown in FIGS. 4A and 4B.

Figure 4A:
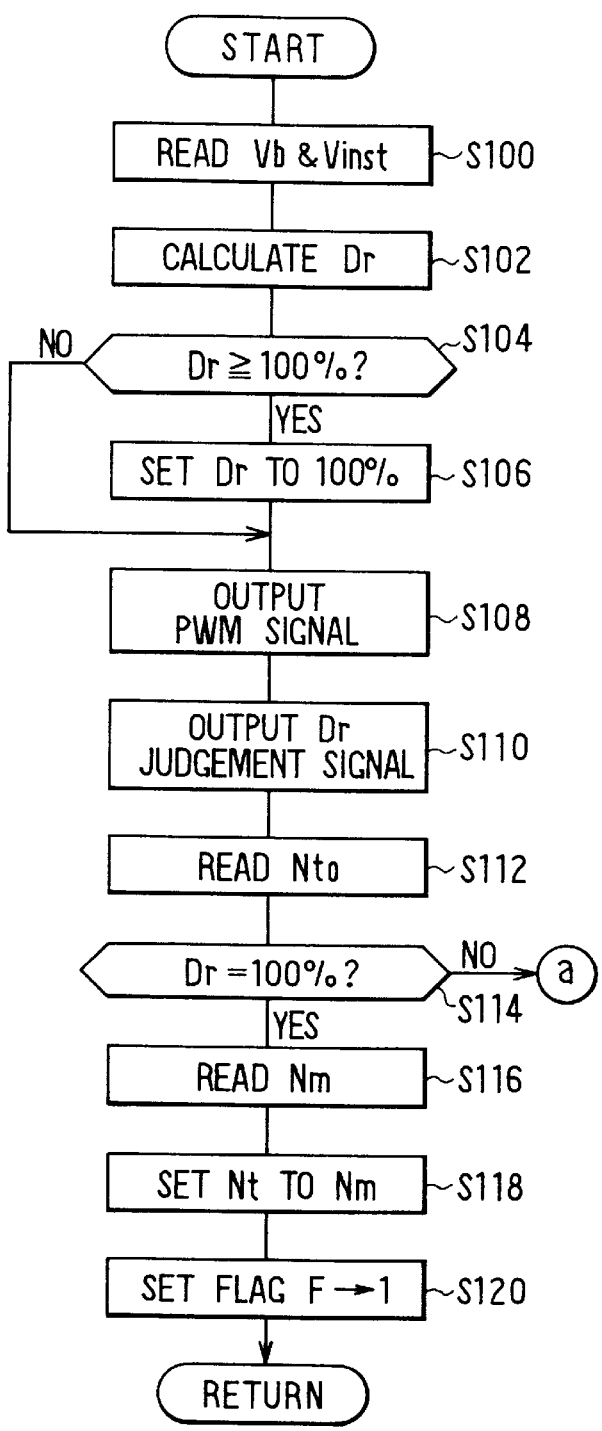
FIGS. 4A and 4B show a flow chart showing an operation process of a rotational speed instructor, a PWM calculator and a duty ratio judgment circuit in the motor controller, FIG. 4A being followed by FIG. 4B.

The PWM calculator 18 performs the process of steps S100–S108 shown in FIG. 4A. At step S100, the battery voltage Vb and the instructed motor voltage Vinst are read. The duty ratio Dr of the inverter 11 is calculated at step S102 according to the following formula: Dr=Vinst/Vb×100%. The duty ratio Dr exceeds 100% under the situation where the instructed motor voltage Vinst has reached the battery voltage Vb and the motor speed Nm is still lower than the target speed Nt, because the rotational speed controller 16 operates to further increase the instructed voltage Vinst under this situation. Therefore, whether the duty ratio Dr exceeds 100% or not is checked at step S104 (this process is performed by the duty ratio judgment circuit 19). If the duty ratio Dr exceeds 100%, the duty ratio is set to 100% at step S106. If not, the process moves to step S108. At step S108, the PWM signal having the duty ratio Dr determined in the above steps is formed and output. The PWM signal is a pulse signal having a predetermined cyclic period and the duty ratio determined. The PWM calculator 18 may be structured with a hardware circuit. For example, the calculation of vinst/vb may be performed by a dividing circuit, and the PWM signal may be obtained from an output of a comparator to which a sawtooth voltage and the voltage corresponding to the calculated value of Vinst/Vb are fed.

The duty ratio judgment circuit 19 performs the process of steps S104 and S110. That is, whether the duty ratio exceeds 100% or not is judged at step S104, and the judgment result is fed to the rotational speed instructor 15 at step S110.

Figure 4B:
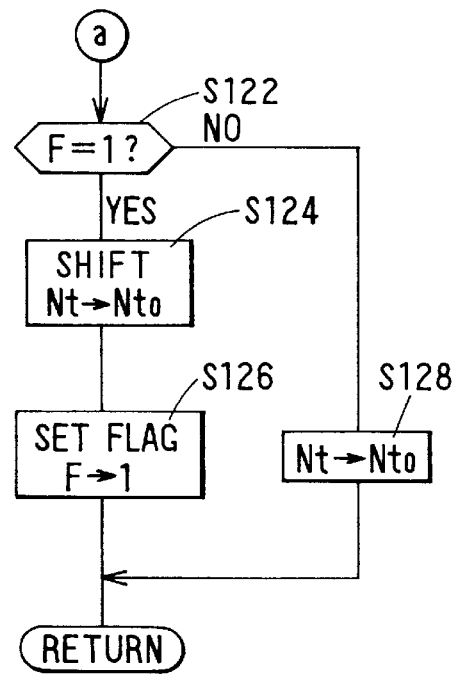

The rotational speed instructor 15 performs the process of steps S112–S128 shown in FIGS. 4A and 4B. At step S112, the target motor speed $Nt_0$ supplied from the outside is read. Whether the duty ratio Dr is 100% or not is checked at step S114. If the duty ratio Dr is 100%, the present motor speed Nm is read at step S116, and the target motor speed Nt is set to the present motor speed Nm at step S118. A flag F is set to "1" that means the duty ratio Dr is 100% at step S120, and then the process returns to a main routine (not shown). If it is determined that the duty ratio Dr is not 100% at step S114, the process moves to step S122 shown in FIG. 4B. At step S122, whether the flag F is "1" or not is checked. If F=1, the target motor speed Nt is gradually shifted to the predetermined target speed $Nt_0$ at step S124. Then, the flag is reset to "0" at step S126, and the process returns to the main routine. If the flag is not "1", the target speed Nt is set to $Nt_0$ at step S128, and then the process returns to the main routine.

Figure 5:
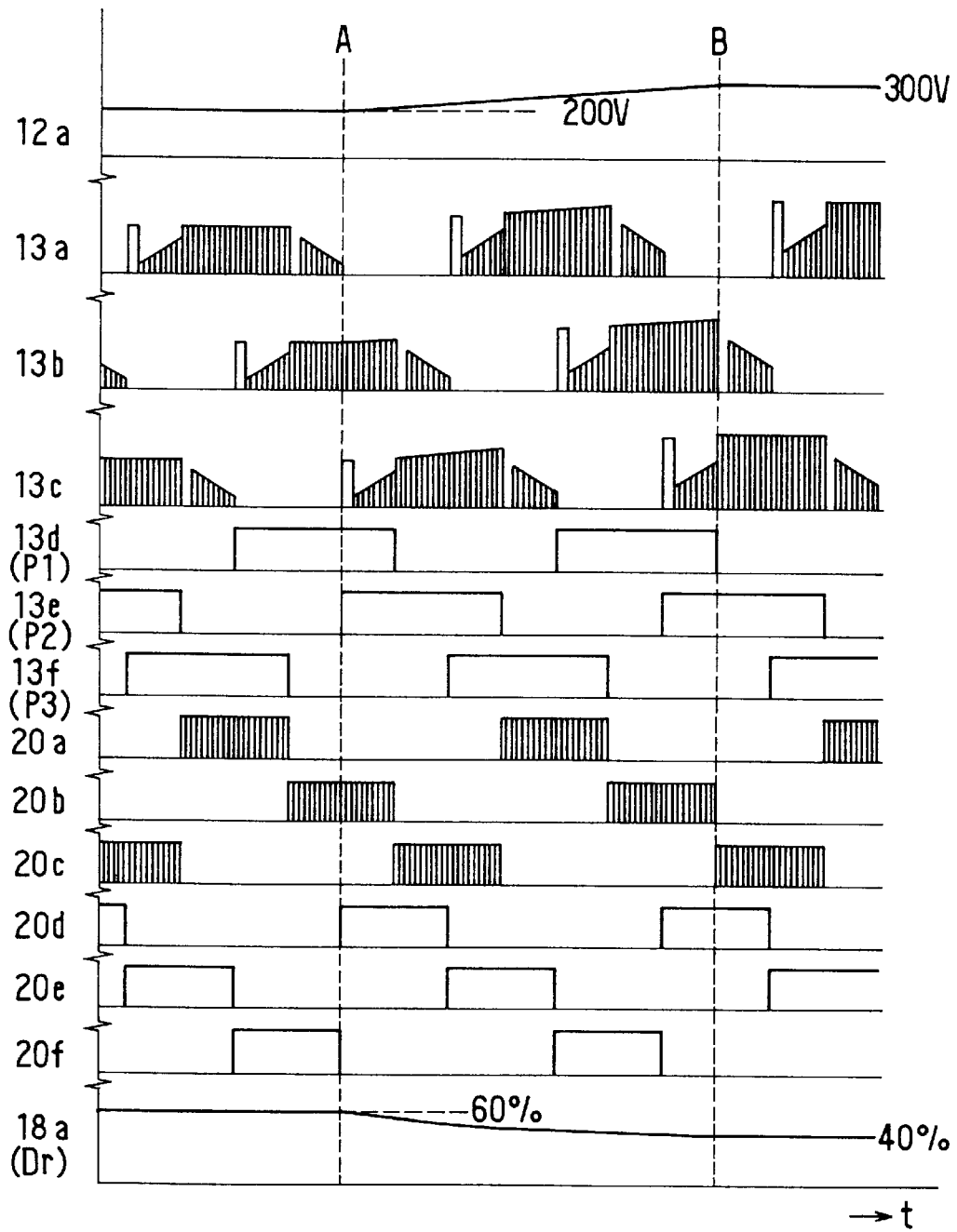
FIG. 5 is a timing chart showing various voltage waveforms in the motor controller.

Referring to the timing chart shown in FIG. 5, the operation of the motor controller under the situation where the battery voltage is increased due to, e.g., regenerative braking will be explained. In the timing chart, the battery voltage Vb (12a), the motor voltage Vm (13a, 13b, 13c, each showing a voltage of each phase), the rotor position signal P (13d, 13e, 13f, each showing a rotor position signal of each phase), the gate voltage Vg (20a–20f), and the duty ratio Dr of the PWM signal are shown in this order from the top of the chart.

In this example shown in the chart, the battery voltage Vb is kept at 200 V up to a time "A" and starts to increase at A due to the regenerative braking, and then the battery voltage Vb rapidly increases and reaches 300 V at a time "B." Up to time A, the duty ratio Dr is 60%, and the motor voltage Vm is 120 V. If the duty ratio Dr is kept at 60% after time A as in the conventional controller, the motor voltage Vm rapidly increases in accordance with the increase of the battery voltage Vb and reaches to a level of 180 V (300 V×60%) at time B. As a result, the rotor position detector 13 malfunctions and outputs an erroneous rotor position signal P, thereby causing loss of synchronism in the motor. To avoid such an erroneous operation, according to the present invention, the duty ratio Dr is decreased from 60% to 40% when the battery voltage Vb increases. Thereby the motor voltage Vm is kept at a constant level of 120 V.

Figure 6:
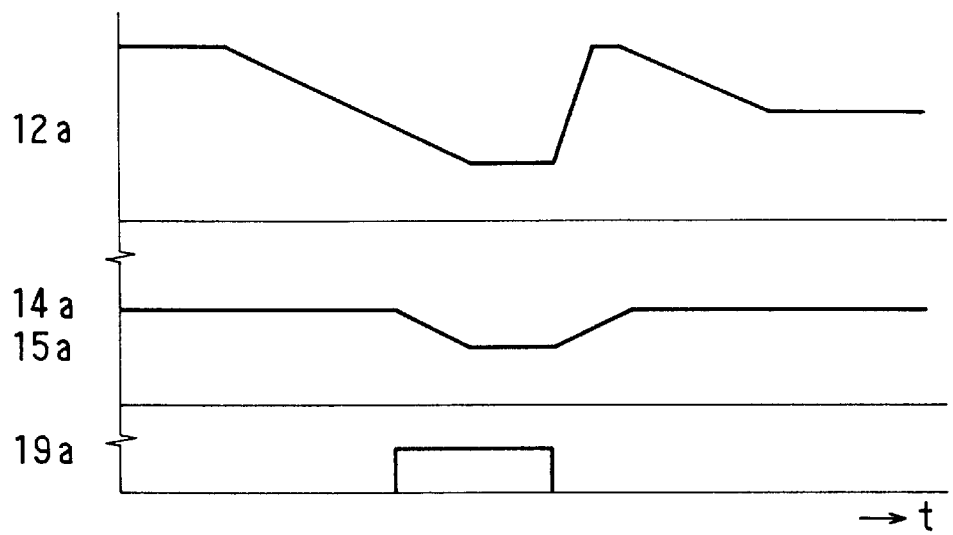
FIG. 6 is a timing chart showing a power source voltage, motor speeds and a PWM duty ratio in the motor controller of the present invention.

Referring to FIG. 6, the operation of the motor controller of the present invention under the situation where the battery voltage Vb decreases and the duty ratio reaches 100% will be explained. In the timing chart of FIG. 6, the battery voltage Vb (12a), the motor speed Nm (14a), the target motor speed Nt (15a) and the duty ratio judgment signal 19a are shown in this order. When the battery voltage Vb decreases from an initial level and becomes below a certain level, the target motor speed Nt cannot be maintained any more. Under this situation, the duty ratio Dr becomes 100%, and thereby the duty ratio judgment signal 19a is set. Upon setting the duty ratio judgment signal, the rotational speed instructor 15 temporarily sets the target motor speed Nt to the present motor speed Nm. Thereafter, when the battery voltage Vb abruptly increases due to regenerative braking as shown in the chart, the duty ratio Dr becomes lower than 100%. Accordingly, the rotor position signal P is generated in a normal manner, and the duty ratio judgment signal 19a is reset. At this time, the rotational speed instructor 15 gradually increases the target motor speed Nt which is temporarily set to Nm to the initial level of $Nt_0$.

The operation described above can be summarized as follows. The target motor speed Nt is temporarily decreased to the level of the present motor speed Nm, when the battery voltage Vb decreases and the duty ratio Dr becomes 100%. Therefore, when the battery voltage Vb abruptly increases thereafter, the voltage Vm imposed on the motor does not increase abruptly in proportion to the battery voltage Vb. Since the abrupt increase of the motor voltage vm is thus avoided, the rotor position is correctly detected based on the motor voltage Vm. The abrupt increase of the motor speed is avoided even if the battery voltage Vb rapidly increases due to the regenerative braking.

Figure 7:
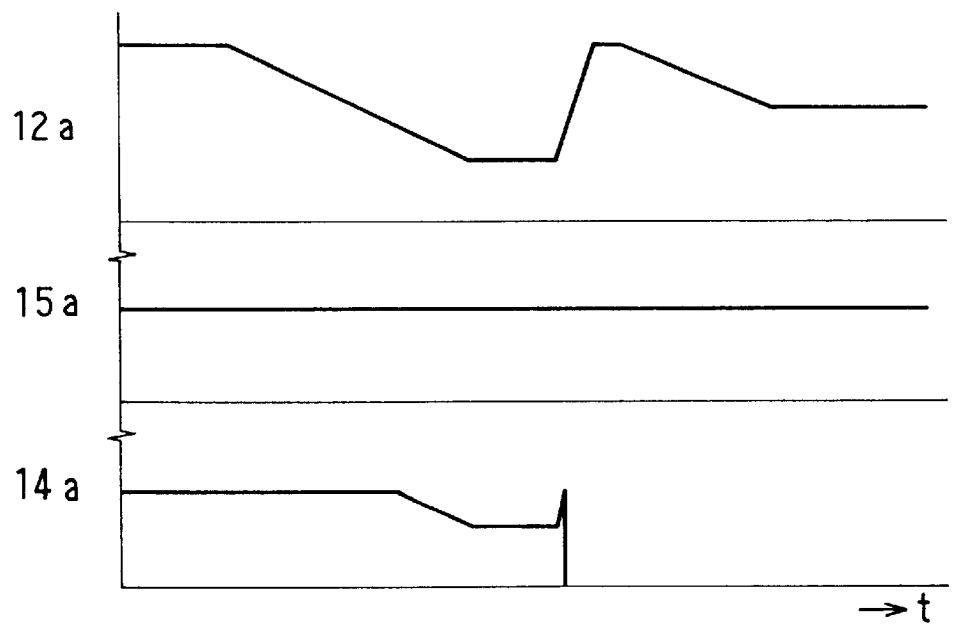
FIG. 7 is a timing chart showing a power source voltage, a motor speed and a PWM duty ratio in a conventional motor controller.

For comparison purpose, the operation of a conventional motor controller under the same situation as described above is shown in FIG. 7. The target motor speed Nt (15a) is kept at a previous level when the battery voltage Vb (12a) decreases and the duty ratio reaches 100%. Therefore, there exists a big difference between the target motor speed Nt and the actual motor speed Nm which has been decreased in accordance with the battery voltage drop. Accordingly, the duty ratio is kept at the 100% level when the battery voltage Vb abruptly increases thereafter due to the regenerative braking. As a result, the motor speed abruptly increases in accordance with the abrupt increase of the battery voltage Vb, and the rotor position cannot be correctly detected, thereby bringing the motor to a halt. In other words, the conventional control cannot properly follow the abrupt battery voltage increase.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A device for controlling a sensorless brushless-DC-motor driven by a DC power source, the device comprising:
   an inverter for supplying a three-phase pulse width modulated motor voltage to the sensorless brushless-DC-motor, the motor voltage being formed from the DC power source; and
   a controller for controlling operation of the inverter, the controller including a rotational speed detector detecting a motor speed based on a rotor position determined from the motor voltage, the controller controlling a duty ratio of the three-phase pulse width modulated motor voltage to reduce a difference between a target motor speed and the detected motor speed, wherein,
   the controller modifies the duty ratio to eliminate influence of the voltage variation of the DC power source to an average level of the motor voltage, and wherein,
   the rotor position is determined based on the motor voltage controlled to eliminate variation of a voltage of the DC power source.

2. A device for controlling a sensorless brushless-DC-motor driven by a DC power source, the device comprising:
   an inverter for supplying a three-phase pulse width modulated motor voltage to the sensorless brushless-DC-motor, the motor voltage being formed from the DC power source; and
   a controller for controlling operation of the inverter, the controller including a rotational speed detector detecting a motor speed based on a rotor position determined from the motor voltage, the controller controlling a duty ratio of the three-phase pulse width modulated motor voltage to reduce a difference between a target motor speed and the detected motor speed, wherein,
   the controller temporarily sets the target motor speed to a level of the detected motor speed when the duty ratio reaches 100% and the temporarily set level is kept during a period in which the duty ratio is 100%; and the controller gradually shifts the temporarily set target motor speed to a level of the original target motor speed after the duty ratio becomes below 100%, and wherein, the rotor position is determined based on the motor voltage controlled to eliminate variation of a voltage of the DC power source.

3. A method of controlling a sensorless brushless-DC-motor driven by a battery through a motor controller connected between the motor and the battery, the method comprising steps of:

inverting a DC voltage of the battery into a three-phase pulse voltage having a controllable duty ratio;

supplying the pulse voltage to the motor;

setting a target motor speed at a predetermined level;

detecting a motor speed based on the pulse voltage supplied to the motor;

calculating a speed difference between the detected motor speed and the target motor speed;

modulating the duty ratio of the pulse voltage to minimize the speed difference;

changing the target motor speed to a level of the detected motor speed, when the battery voltage decreases and thereby the duty ratio of the pulse voltage reaches 100%;

maintaining the target motor speed at the detected motor speed level during a period in which the duty ratio is 100%; and gradually shifting the target motor speed maintained at the detected motor speed level to the predetermined level after the duty ratio becomes lower than 100%.

* * * * *